US011861299B2

(12) United States Patent
Adler et al.

(10) Patent No.: US 11,861,299 B2
(45) Date of Patent: *Jan. 2, 2024

(54) METHODS AND SYSTEMS FOR POPULATING APPLICATION-SPECIFIC INFORMATION USING OVERLAY APPLICATIONS

(71) Applicant: Capital One Services, LLC, McLean, VA (US)

(72) Inventors: Matthew Adler, McLean, VA (US); Casey Barrett, McLean, VA (US); Madeline Beyl, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/152,799

(22) Filed: Jan. 11, 2023

(65) Prior Publication Data

US 2023/0161954 A1 May 25, 2023

Related U.S. Application Data

(63) Continuation of application No. 17/319,234, filed on May 13, 2021, now Pat. No. 11,580,296, which is a continuation of application No. 17/110,795, filed on Dec. 3, 2020, now Pat. No. 11,030,397.

(51) Int. Cl.
*G06F 40/174* (2020.01)
*G06F 3/04817* (2022.01)
*G06F 3/04842* (2022.01)
*G06F 9/54* (2006.01)

(52) U.S. Cl.
CPC ........ *G06F 40/174* (2020.01); *G06F 3/04817* (2013.01); *G06F 3/04842* (2013.01); *G06F 9/54* (2013.01)

(58) Field of Classification Search
CPC .. G06F 40/17; G06F 3/04817; G06F 3/04842; G06F 9/54
USPC ........................................................ 715/744
See application file for complete search history.

(56) References Cited

U.S. PATENT DOCUMENTS

| | | | | |
|---|---|---|---|---|
| 10,007,948 | B1* | 6/2018 | Nickerson | G07F 9/023 |
| 10,853,513 | B1* | 12/2020 | Ganeshmani | H04M 1/72403 |
| 11,030,397 | B1* | 6/2021 | Adler | G06F 9/54 |
| 11,580,296 | B2* | 2/2023 | Adler | G06F 9/54 |
| 2016/0196584 | A1* | 7/2016 | Franklin | G06F 3/04817 |
| | | | | 715/745 |
| 2021/0295047 | A1* | 9/2021 | Furlan | G06T 7/74 |

* cited by examiner

*Primary Examiner* — William D Titcomb
(74) *Attorney, Agent, or Firm* — Perkins Coie LLP

(57) ABSTRACT

Methods and systems are described herein for populating application-specific information using overlay applications. For example, in order to relieve some of the difficulties users face in inputting information into mobile devices which may have smaller screen sizes and may not feature dedicated input mechanisms, the methods and systems described herein automatically populate application-specific information. The methods and systems do this using an application that presents an application overlay feature. That is, the application is accessible while a user is using another application (e.g., on the mobile device) and/or while a user is scrolling through other applications.

20 Claims, 5 Drawing Sheets

METHODS AND SYSTEMS FOR POPULATING APPLICATION-SPECIFIC INFORMATION USING OVERLAY APPLICATIONS

CROSS REFERENCE TO RELATED APPLICATIONS

This application is a continuation of U.S. patent application Ser. No. 17/319,234, filed on May 13, 2021, now U.S. Pat. No. 11,580,296, issued on Feb. 14, 2023, which is a continuation of U.S. patent application Ser. No. 17/110,795, filed on Dec. 3, 2020, now U.S. Pat. No. 11,030,397, issued on Jun. 8, 2021. The contents of the foregoing applications are incorporated herein in their entirety by reference.

FIELD OF THE INVENTION

The invention relates to populating application-specific information using overlay applications.

BACKGROUND

In recent years, the amount of content and functions available on mobile devices has increased exponentially. Moreover, users are increasing using mobile devices to perform functions previously done on stationary computer devices with dedicated input mechanisms (e.g., mouse controls, keyboards, remote controls, etc. As users migrate to performing functions on mobile devices, users face difficulties as mobile devices may have smaller screen sizes and may not feature dedicated input mechanisms.

SUMMARY

Methods and systems are described herein for populating application-specific information using overlay applications. For example, in order to relieve some of the difficulties users face in inputting information into mobile devices which may have smaller screen sizes and may not feature dedicated input mechanisms, the methods and systems described herein automatically populate application-specific information. The methods and systems do this using an application that presents an application overlay feature. That is, the application is accessible while a user is using another application (e.g., on the mobile device) and/or while a user is scrolling through other applications.

By presenting access to the application as an application overlay feature, a user does not need to switch between one application and another in order to populate information. For example, a user does not need to exit a native application that requests information to be populated (and/or leave the native application running in the background) in order to access the application overlay feature. This allows a user to more efficiency access the application overlay feature and prevents the user from having to switch back and forth between the native application and the application that provides the application overlay feature (e.g., copying information from one application, closing the application, and opening another application to paste the information into). This ease of use is particularly beneficial in mobile devices, which have smaller screen sizes and often use touchscreen interfaces.

Furthermore, the methods and systems described herein provide a more secure environment for auto-populating application-specific information. For example, although it is designed to simplify the user experience, common autocomplete features can become a liability once attackers gain access to a network, a device, or browsers used by the device. This is even true for autocomplete features that are tied to a particular device (e.g., a smartphone), a particular account (e.g., a smartphone account), and/or tied to a password or biometric input (e.g., a thumbprint). For example, if an unauthorized party (e.g., a hacker) gains access to a browser application of a user, the unauthorized party may log into a user's accounts easily because the autocomplete feature will fill in the user's email address and password credentials. Moreover, if the user has previously entered a credit card number, the unauthorized party may access the credit card number to make unauthorized purchases.

To overcome the security issues in conventional systems, the methods and systems described herein use the overlay application to transmit a request for supplemental content for use in populating application-specific data. As opposed to conventional autocomplete features that store data locally, the methods and systems transmit a request to a remote source for the supplemental content. Requesting the application-specific data from a remote source has numerous technical advantages any of which may be present in a given embodiment. First, the supplemental content is selected by the remote source and provided back to the requesting device. Accordingly, the supplemental content may be selected and/or generated based on numerous criteria (not simply what data was last entered). For example, the remote source may select the application-specific data based on both the application for which information needs to be populated and specific fields in the application that needs to be populated. The remote source may therefore act as a thick client and the application overlay may act as a thin client. This client server approach allows for more data and processing power intensive operations to occur (e.g., operations beyond the storage and processing capabilities of the local device).

Second, transmitting the request to the remote source for the supplemental content allows the application overlay application and the remote source control the environment in which the supplemental content is generated. For example, to enhance security, the overlay application may retrieve supplemental content that is both proprietary and encrypted in a secure format at the remote source. The supplemental content may thus be modified, updated, and/or changed in real-time and upon a schedule of the remote source. In contrast, conventional autocomplete features use static data that remains in its static form on the device. As the data is static, previous security breaches may allow the static data to remain compromised. For example, in some embodiments, the supplemental content may be a virtual account number or other information that corresponds to an entity corresponding to the application that requires data to be populated. For example, in order to ensure online transactions are more secure, a provider of the overlay application may provide a virtual account number. The virtual account number may be tied to a credit card or other bank account number. The virtual account number may be continuously changed by the remote source with each new iteration being continued to be tied to the credit card or other bank account number. As only the virtual account number is shared with third-party applications, the credit card or other bank account number remains secure. Furthermore, if a data breach occurs, the virtual account number may be changed or deleted without affecting other virtual account numbers (e.g., virtual account numbers for other applications).

Third, transmitting the request to the remote source for the supplemental content allows the overlay application and the remote source to select supplemental content (e.g., a virtual number) that is specific to an application or third-party entity corresponding to an application. Accordingly, even if a data breach occurs and the supplemental content (e.g., virtual number has not yet been changed), the supplemental content is only useful for the designated application or third-party entity corresponding to an application. In some embodiments, the virtual account number may be uniquely generated for a particular transaction. The number may be linked to the transaction based on transaction details (e.g., price, date, time, etc.) and only used for that particular transaction. A feature that is not possible with conventional autocomplete features.

Finally, as transmitting the request to the remote source for the supplemental content is tied to the overlay application, requested for the supplemental content may be configured to occur only in response to a user input. That is, the requests for the supplemental content may be transmitted as, e.g., application program interface "API" requests. The overlay application therefore is not required to continuously stay synched and the overlay application and its transmission of data may be controlled by the user.

In some aspects, methods and systems for populating application-specific information using overlay applications are described. For example, the system may generate for display, on a mobile device, an application overlay, corresponding to a first application, wherein the application overlay overlays a user interface generated by a second application. The system may receive a user input selecting the application overlay while the user interface is displayed. The system may, in response to the user input identify the second application and determine whether a field currently displayed in the user interface corresponds to a predetermined field that is automatically populated by the first application. The system may, in response to determining that the field corresponds to a predetermined field, transmit, to a remote source, a request for supplemental content for populating the field, wherein the supplemental content is selected from available supplemental content based on the second application and the field. The system may receive, from the remote source, the supplemental content; and populating the field in the second application with the supplemental content.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention. It should also be noted that the methods and systems disclosed herein are also suitable for applications unrelated to mobile applications.

Figure 1:
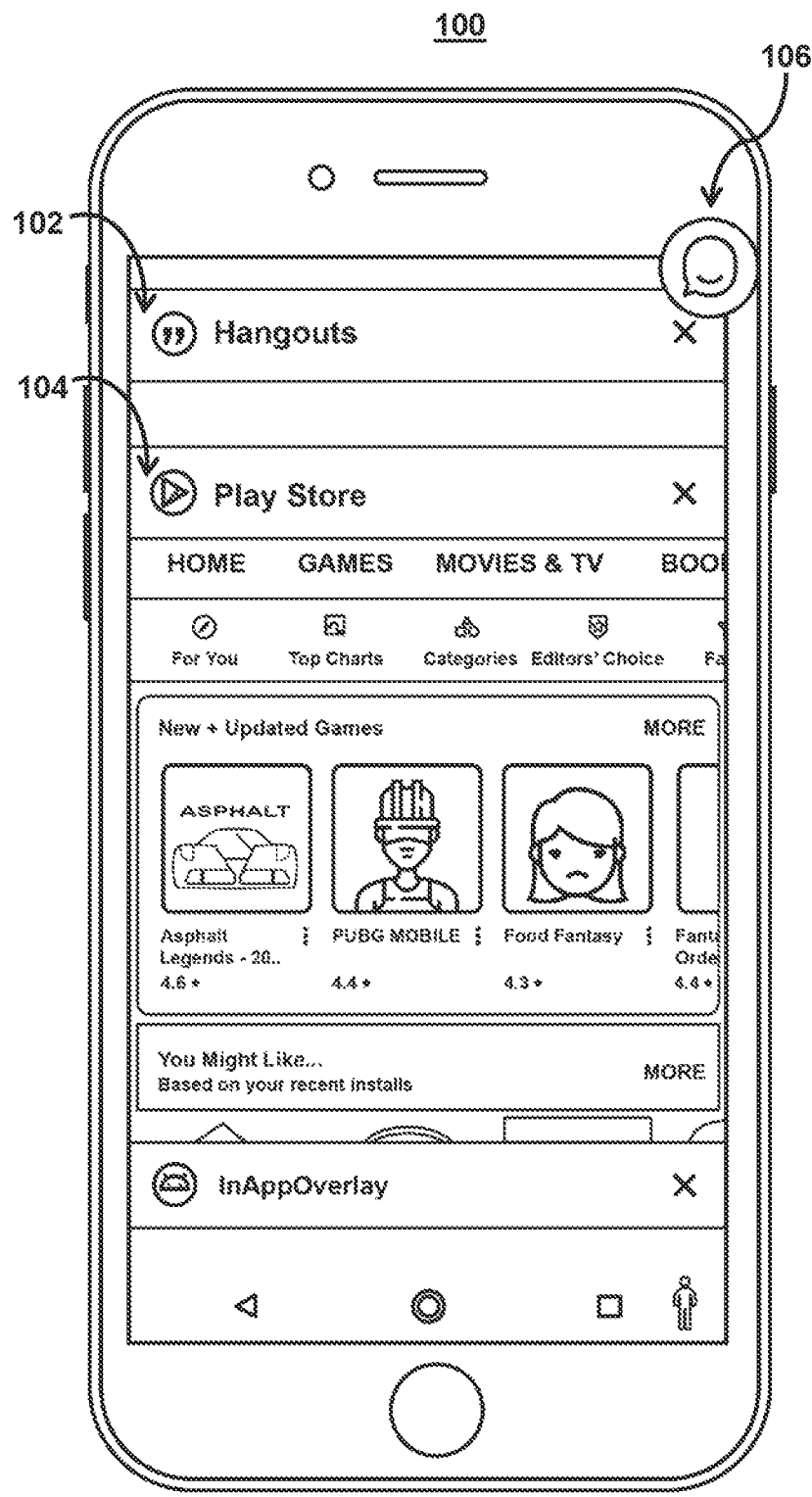
FIG. 1 shows an illustrative example of an application overlay generating an icon during transitions between native applications, in accordance with one or more embodiments.

FIG. 1 shows an illustrative example of an overlay application generating an icon during transitions between native applications, in accordance with one or more embodiments. For example, user interface 100 includes application 102 and application 104 as well as icon 106, which may be generated by as an application overlay by an overlay application. As referred to herein, an "application overlay" may comprise a screen overlay generated by an overlay application (e.g., an application configured to generate screen overlay). A screen overlay allows an application to display content over another application running on a device and/or using an operating system. Each overlay application may be specific to a given operating system and may generate the screen overlay using permission specific to the device and/or operating system. For example, in some operating system a screen overlay is generated using a "SYSTEM_ALERT_WINDOW" permission. For example, the permission allows an application to display content on the screen of the device in response to a triggering event.

In some embodiments, a triggering event for the application overlay may be the detection of a third-party application for which supplemental content may be provided by the overlay application. For example, the system (e.g., the overlay application) may determine that a currently displayed third-party application (or currently displayed fields of the third-party application) may be automatically populated by the overlay application. For example, the system may detect that the third-party application corresponds to a third-party for which the overlay application may provide supplemental content (e.g., a virtual account number). In response, the system may generate an icon (e.g., icon 106) on user interface 100. Icon 106 may indicate that supplemental content and/or auto-population of application-specific data is available.

In some embodiments, a triggering event for the application overlay may be the launching of the overlay application and/or the powering on of a device upon which the overlay application is implemented. For example, icon 106 may appear automatically upon a user powering on the device, launching the overlay application, and/or launching another application. The system may then wait for a user input (e.g., selecting icon 106). Upon receiving the user input, the system (e.g., the overlay application) may determine that the currently displayed third-party application (or currently displayed fields of the third-party application) and may attempt to automatically populated information for the third-party application. For example, the system may detect that the third-party application corresponds to a third-party for which the overlay application may provide supplemental content (e.g., a virtual account number). In response, the system may transmit a request for the supplemental content. Alternatively or additionally, the system may collect information about the third-party application and/or a currently display field and transmit that information to a remote source. The remote source may then determine whether or not supplemental content may be automatically populated. For example, the remote source may identify the third-party application and determine supplemental content for the application.

In some embodiments, the system may detect one or more features or characteristics of application 102, application 104, or a device generating user interface 100. As described herein, a feature may include any visual characteristic, option, and/or functional capability provided to a user by software and/or hardware. For example, a feature may include a distinctive attribute or aspect of the software and/or hardware such as how data is displayed, where data is display, what type of data is display, what functions are available, etc. For example, in some embodiments, a feature may be an available function of an application, operating system, and/or device. In some embodiments, the feature may be provided as part of an application and/or may be provided as a plug-in, applet, browser extension, and/or other software component for an existing application. For example, the feature may be part of an application and/or other program that may be toggled on or off. In another example, the feature may be a software component that may be added and/or removed from an application.

In some embodiments, the feature may be a conceptual data model of the application and/or one or more fields of the application (e.g., the fields currently displayed by the application). For example, the conceptual data model may be a representation of data objects, the associations between different data objects, and/or the rules of the application. In some embodiments, the system may determine a visual representation of the data and apply consistent naming conventions, default values, and semantics to one or more fields in the model. These naming conventions, default values, and semantics of the one or more fields in the model may then be used by the system to generate an application identification number for the application. The system may use the application identification number to identify the application. For example, the system may compare the application identification number to an application identification number database (e.g., a look up table database listing application identification numbers and the entity (e.g., developers, sources, content provider, app provider, etc.) corresponding to each) to identify the entity corresponding to the application.

Each application may display particular information and/or information of a particular type. Alternatively or additionally, each application may provide a given function. This function may be a locally performed function (e.g., a function performed on a local device) or this function may be a remotely-executed function. In some embodiments, the application may include a link to additional information and/or other applications, which may be accessed and/or available locally or remotely. In some embodiments, the application may be represented by textual and/or graphical information. For example, an application may comprise a purchasing function through which a user may enter information (e.g., user credential and/or payment account information) that when transmitted may cause a purchase to occur. The system may identify these characteristics and application features for use in generating the conceptual data model.

In some embodiments, the system may detect information about a feature of an application (e.g., metadata or other information that describes the feature). For example, the information may describe a purpose, functions, origin, creator, developer, a system requirement (including required formats and/or capabilities), author, recommended use and/or approved user. The information may be expressed in a human and/or computer readable language or may not be perceivable to a user viewing user interface 100.

The information may also include a reference or pointer to user profile information that may be relevant to the selection and/or use of the feature. The system may retrieve this information and/or compare it to the description in order to verify, select and/or use the feature. For example, the description may indicate that the feature uses a particular format, relates to a particular user, user device, and/or user account.

The system may access a user profile. The user profile may be stored locally on a user device (e.g., user device 322 (FIG. 3)) and/or a remote source (e.g., a component of system 300 (FIG. 3)). The user profile may include information about a user and/or device of a user. The information may be generated by actively and/or passively monitoring actions of the user. The user profile may also include information aggregated from one or more sources (including third-party sources). The information in the user profile may include personally identifiable information about a user and may be stored in a secure and/or encrypted manner. The information in the user profile may include information about user settings and/or preferences of the user, activity of the user, demographics of the user, and/or any other information used to target a feature towards a user and/or customize features for a user.

In some embodiments, the system may pre-fetch supplemental content as a user navigates and/or user one or more application. The system may pre-fetched this information based on information in the user profile (e.g., a user preference or setting), a predetermined or standard application feature selection (e.g., by the application), a previously selected feature when the application was last used, and/or other criteria. For example, the system may continuously, and in real-time, pre-fetch (or request) supplemental content for automatically populating application-specific information. The system may continuously pre-fetch this information and/or may push this information to a local user device and/or edge server for immediate use if an application is activated. Accordingly, the system may minimize delays attributed to populating application-specific data and attributed to processing time needed by a remote source.

Icon 106 may include a first link. For example, the link may include a hyperlink. For example, the link may include a link from a hypertext file or document to another location or file, typically activated by clicking on a highlighted word or image on the screen. The link may be an inline link that displays remote content without the need for embedding the content. For example, the inline link may display a modified version of accessible content (e.g., an image, a thumbnail, low resolution preview, cropped section, or magnified section of the accessible content). Alternatively the link may be an anchor link and/or fat link. In some embodiments, the first link may comprise a push notification. For example, the push notification may have been generated in real-time based on a determination by the system (e.g., by machine learning model 302 (FIG. 2)) that application-specific data may be needed. In response to a user selection of icon 106 in user interface 100, the system may transmit a request to a remote source (e.g., web server 310 (FIG. 3)). Alternatively or additionally, the system may generate a new icon or an icon with additional information as shown in FIG. 2.

Figure 2:
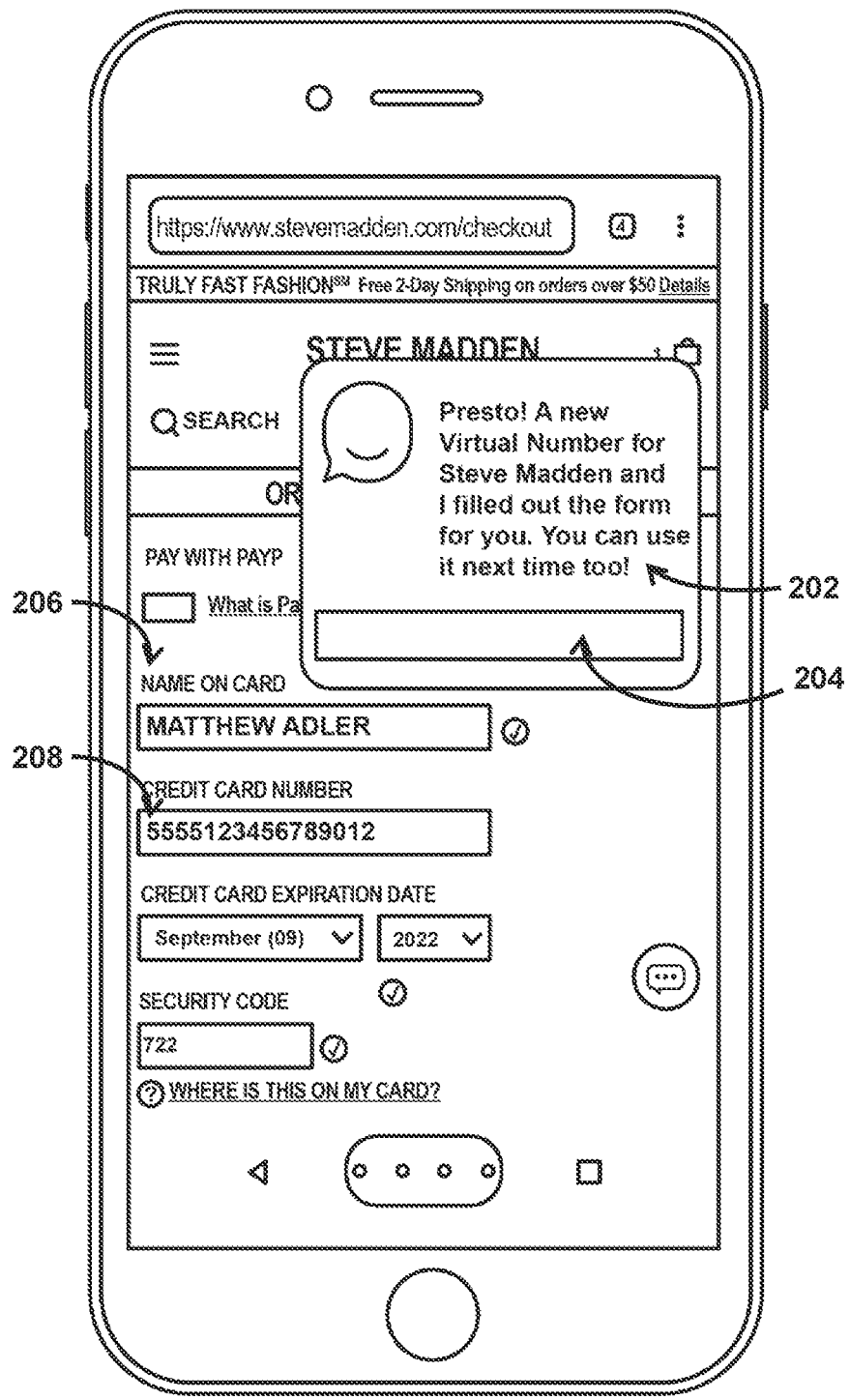
FIG. 2 shows an illustrative example of an application overlay generating a prompt for automatically populating application-specific information, in accordance with one or more embodiments.

FIG. 2 shows an illustrative example of an application overlay generating a prompt for automatically populating application-specific information, in accordance with one or more embodiments. For example, user interface 200 may include icon 202 (which may have replaced icon 106 (FIG. 1)). Icon 202 may include user prompts for initialing a request (e.g., user prompt 204).

In response to a selection of user prompt 204, the system may generate a request for application-specific data (e.g., to populate fields 206 and 208). Alternatively or additionally, in response to a user selection of prompt 204, the system may identify an application shown in user interface 200 and determining whether a field (e.g., field 206 and 208) currently displayed in the user interface corresponds to a predetermined field that is automatically populated by the first application. For example, the system may retrieve metadata used to determine a type of field and compare the type to a predetermined type of field that is automatically populated by an overlay application. In response to determining that the field corresponds to a predetermined field, the system may transmit, to a remote source (e.g., web server 310 (FIG. 3)), a request for supplemental content for populating the field.

The request may comprise an API request (or call) from one application (e.g., an overlay application implemented on a local device) to an application on a server (e.g., a server implementing web server 310 (FIG. 3)). The request may include one or more types of information that may be used by the web server to respond to the request. For example, the request may include information used to select application-specific data, identify and application, and/or determine field for populating.

For example, in some embodiments, the application overlay may create a library to simplify communicating using API requests and managing user, application, and session data. The system may therefore support multiple data providers and federated routing development, including better management of application/sub-application routing, consistent capture of data, and/or identification of fields. For example, a third-party application may have a field called "paymenttype", the system may have data for populating payment type information in a record labeled "payTP". Using the library the API request may normalize the format in the request.

Figure 3:
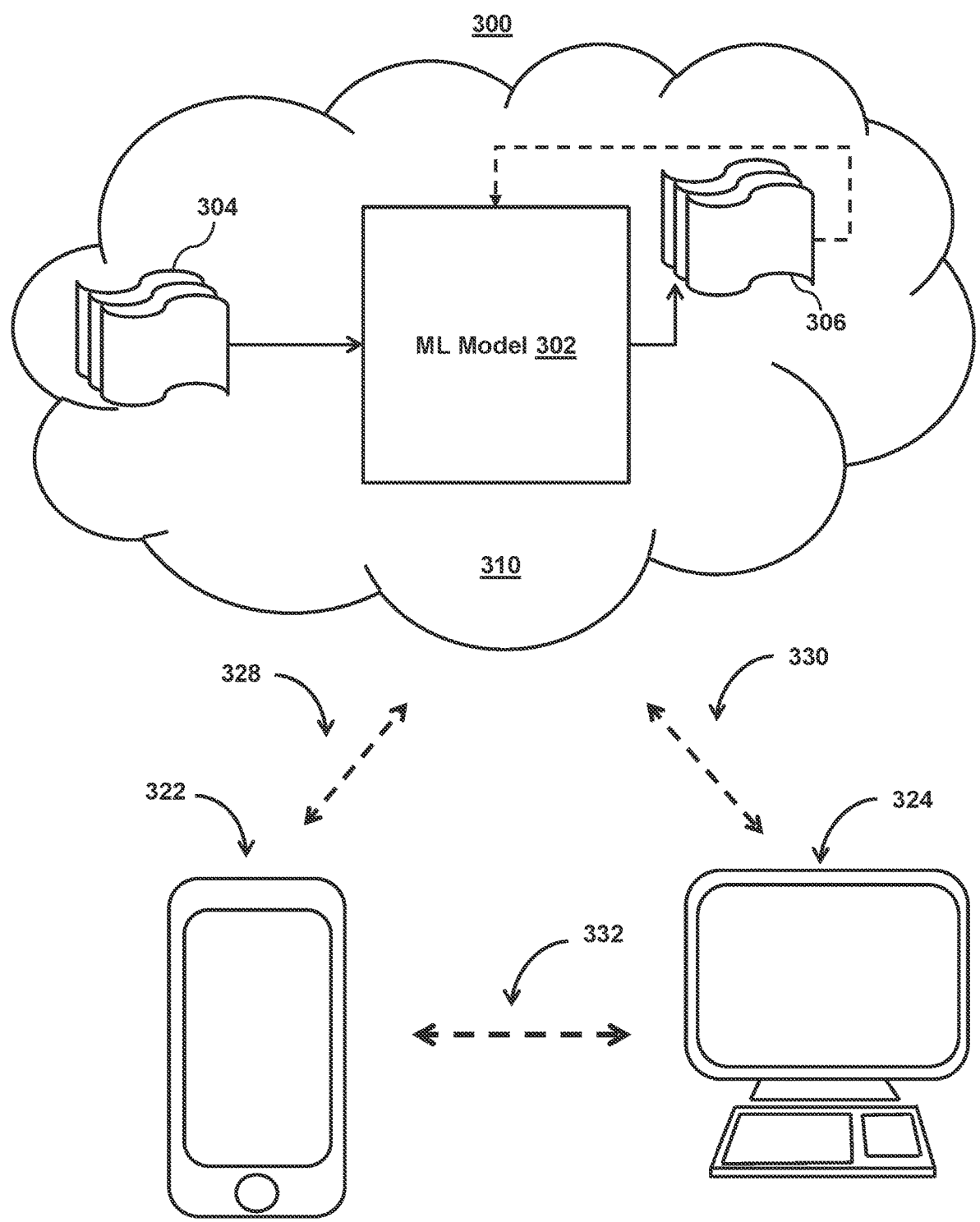
FIG. 3 shows an illustrative system for populating application-specific information using overlay applications, in accordance with one or more embodiments.

FIG. 3 shows an illustrative system for populating application-specific information using overlay applications, in accordance with one or more embodiments. As shown in FIG. 3, system 300 may include user device 322, user device 324, and/or other components. Each user device may include any type of mobile terminal, fixed terminal, or other device. For example, each of these devices may comprise one or more of the devices shown in FIG. 1. Each of these devices may receive content and data via input/output (hereinafter "I/O") paths and may also include processors and/or control circuitry to send and receive commands, requests, and other suitable data using the I/O paths. The control circuitry may be comprised of any suitable processing circuitry. Each of these devices may also include a user input interface and/or display for use in receiving and displaying data (e.g., user interface 100 (FIG. 1)).

By way of example, user device 322 and user device 324 may include a desktop computer, a server, or other client device. Users may, for instance, utilize one or more of the user devices to interact with one another, one or more servers, or other components of system 300. It should be noted that, while one or more operations are described herein as being performed by particular components of system 300, those operations may, in some embodiments, be performed by other components of system 300. As an example, while one or more operations are described herein as being performed by components of user device 322, those operations may, in some embodiments, be performed by components of user device 324. System 300 also includes machine learning model 302, which may be implemented on user device 322 and user device 324, or accessible by communication paths 328 and 330, respectively. It should be noted that, although some embodiments are described herein with respect to machine learning models, other prediction models (e.g., statistical models or other analytics models) may be used in lieu of, or in addition to, machine learning models in other embodiments (e.g., a statistical model replacing a machine learning model and a non-statistical model replacing a non-machine learning model in one or more embodiments).

Each of these devices may also include memory in the form of electronic storage. The electronic storage may include non-transitory storage media that electronically stores information. The electronic storage of media may include (i) system storage that is provided integrally (e.g., substantially non-removable) with servers or client devices and/or (ii) removable storage that is removably connectable to the servers or client devices via, for example, a port (e.g., a USB port, a firewire port, etc.) or a drive (e.g., a disk drive, etc.). The electronic storages may include optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 4G or LTE network), a cable network, a public switched telephone network, or other types of communications network or combinations of communications networks. Communication paths 328, 330, and 332 may include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

As an example, with respect to FIG. 3, machine learning model 302 may take inputs 304 and provide outputs 306. The inputs may include multiple data sets such as a training data set and a test data set. In some embodiments, outputs 306 may be fed back to machine learning model 302 as input to train machine learning model 302 (e.g., alone or in conjunction with user indications of the accuracy of outputs 306, labels associated with the inputs, or with other reference feedback information). In another embodiment, machine learning model 302 may update its configurations (e.g., weights, biases, or other parameters) based on the assessment of its prediction (e.g., outputs 306) and reference feedback information (e.g., user indication of accuracy, reference labels, or other information). In another embodiment, where machine learning model 302 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 302 may be trained to generate better predictions.

In some embodiments, machine learning model 302 may include an artificial neural network. In such embodiments, machine learning model 302 may include input layer and one or more hidden layers. Each neural unit of machine learning model 302 may be connected with many other neural units of machine learning model 302. Such connections can be enforcing or inhibitory in their effect on the activation state of connected neural units. In some embodiments, each individual neural unit may have a summation function which combines the values of all of its inputs together. In some embodiments, each connection (or the neural unit itself) may have a threshold function such that the signal must surpass before it propagates to other neural units. Machine learning model 302 may be self-learning and trained, rather than explicitly programmed, and can perform significantly better in certain areas of problem solving, as compared to traditional computer programs. During training, an output layer of machine learning model 302 may correspond to a classification of machine learning model 302 and an input known to correspond to that classification may be input into an input layer of machine learning model 302 during training. During testing, an input without a known classification may be input into the input layer, and a determined classification may be output.

In some embodiments, machine learning model 302 may include multiple layers (e.g., where a signal path traverses from front layers to back layers). In some embodiments, back propagation techniques may be utilized by machine learning model 302 where forward stimulation is used to reset weights on the "front" neural units. In some embodiments, stimulation and inhibition for machine learning model 302 may be more free-flowing, with connections interacting in a more chaotic and complex fashion. During testing, an output layer of machine learning model 302 may indicate whether or not a given input corresponds to a classification of machine learning model 302). Machine learning model 302 may be used for populating application-specific information using overlay applications or for determining whether or not an application corresponds to a current version of an application.

Figure 4:
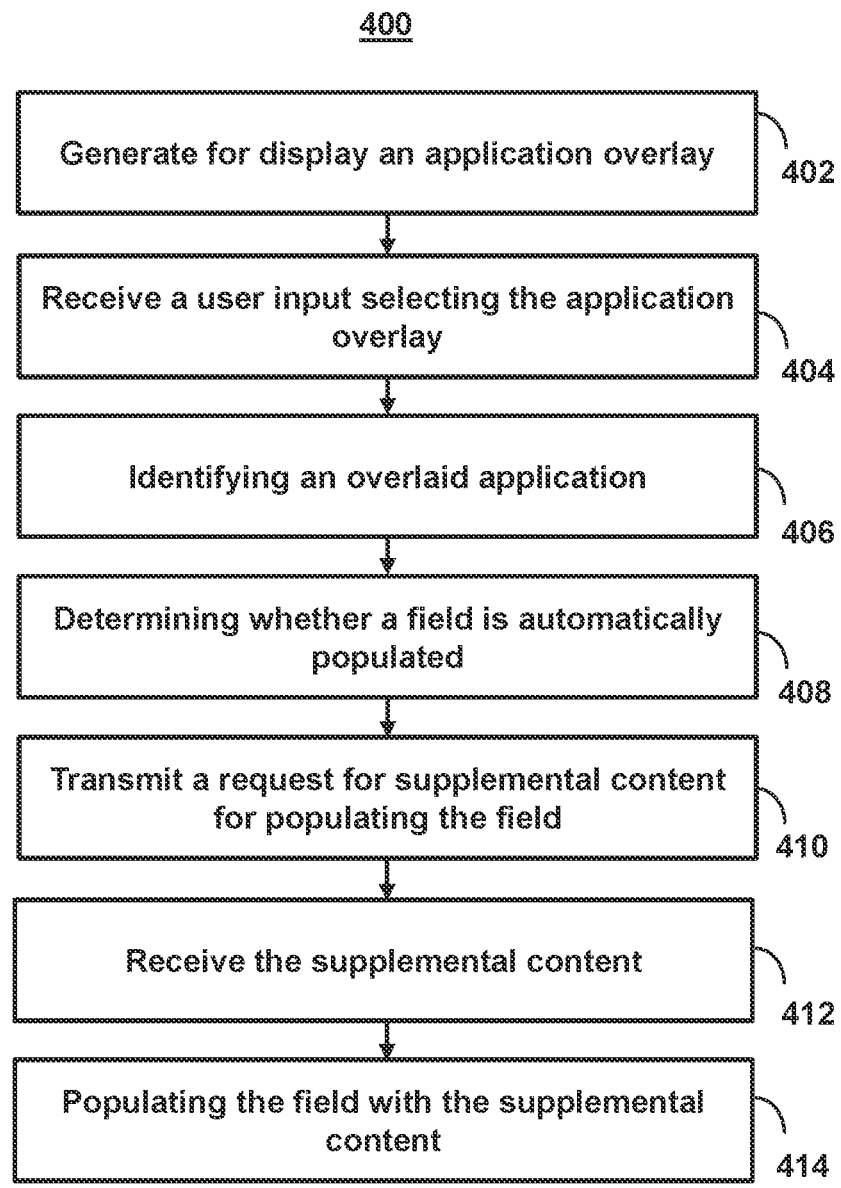
FIG. 4 shows a flowchart of the steps involved in populating application-specific information using overlay applications, in accordance with one or more embodiments.

FIG. 4 shows a flowchart of the steps involved in populating application-specific information using overlay applications, in accordance with one or more embodiments. For example, process 400 provides one embodiment of how to populate application-specific information using overlay applications, in accordance with one or more embodiments.

At step 402, process 400 generates (e.g., via one or more components of FIGS. 1-3) for display an application overlay. For example, the system may generate for display, on a mobile device, an application overlay, corresponding to a first application, wherein the application overlay overlays a user interface generated by a second application. For example, the system may generate an application overlay (e.g., icon 106 (FIG. 1)) that overlays one or more applications (e.g., application 102 (FIG. 1)).

In some embodiments, the system may generate for display a selectable icon corresponding to the application overlay over the user interface. For example, as shown in FIGS. 1-2, the system may comprise one or more icons that allow the user to manually request supplemental content that is application-specific to be automatically populated in application. For example, the system may determine that the application being displayed includes one or more payment fields that require payment information (e.g., a credit card, address, etc.). The system may in response to this determination (or the launching and/or display of the application itself) generate the overlay.

In some embodiments, the system may determine a native overlay for an operating system for the mobile device. The system may then determine a display position for the native overlay; and selecting a position for selectable icon based on the display position. For example, the system may retrieve the native overlay settings for the operating system and/or current configuration of the device. The system may then place the application overlay (e.g., icon 106 (FIG. 1)) in a location on the user interface (e.g., user interface 100 (FIG. 1)) that does not conflict with a position or location in the native overlay. Accordingly, the system ensures that a user does not select the overlay application unintentionally and/or the icon does not interfere with native overlay of the device or operating system.

At step 404, process 400 receives (e.g., via one or more components of FIGS. 1-3) a user input selecting the application overlay. For example, the system may receive a user input selecting the application overlay while the user interface is displayed. In some embodiments, the system may automatically generate a request based on the selection. Alternatively, the system may generate an additional icon that include additional information and/or prompts (e.g., icon 202 (FIG. 2)).

At step 406, process 400 identifies (e.g., via one or more components of FIGS. 1-3) an overlaid application. For example, the system may identify the second application in response to the user input. For example, the overlay application may identify the second application (e.g., an application currently displayed on a user interface (e.g., application 102 on user interface 100 (FIG. 1)) in response to a user selection of the overlay application (e.g., icon 106 (FIG. 1)).

In some embodiments, identifying the second application may comprise determining an application identification number for the second application and comparing the application identification number to an application identification number database to identify the second application. For example, the system may store (e.g., at web server 310 (FIG. 3)) a lookup table database of application identification numbers for all application (or application for which supplemental content is available). For example, the system may determine whether or not a virtual account number is available for the target application. If so, the system may retrieve the virtual account number and populate the application (or a field of the application) with the virtual account number.

In some embodiments, identifying the second application may comprise determining an application identification number for the second application and comparing the application identification number to an application identification number database to identify an entity corresponding to the second application. The system may then query an entity for a current identification number for the second application, receive the current identification number for the second application from the entity, and compare the application identification number to the current identification number.

In some embodiments, identifying the second application may comprise determining a mapping of the second application and comparing the mapping to an application mapping database to identify an entity corresponding to the second application. For example, as opposed to retrieving an application identification number, the system may retrieve a mapping of the fields currently displayed. The system may use this mapping as well as other metadata and other information to identify the application. For example, as opposed to retrieving an application identification number, which may be unauthorized, the overlay application may identify the application based on a mapping and/or other data (e.g., a conceptual data model). Accordingly, the system may identify fraudulent applications and/or out of date versions of the application, even if the application has a legitimate application identification number.

At step 408, process 400 determines (e.g., via one or more components of FIGS. 1-3) whether a field is automatically populated. For example, the system may determine whether a field currently displayed in the user interface corresponds to a predetermined field that is automatically populated by the first application in response to the user input. For example, the system may have a predetermined type and/or number of fields that may be populated (e.g., fields related to a virtual account number assigned by the overlay application provider to the application). The system may determine which fields, if any, correspond to one of these predetermined fields.

In some embodiments, determining whether the field currently displayed in the user interface corresponds to the predetermined field that is automatically populated by the first application, may further comprise determining a conceptual data model for the second application, wherein the conceptual data model includes semantic information and determining the field based on the conceptual data model. For example, the system may determine the type and/or function of each field and the purpose for which value entered into the field are used. For example, in response to determining that the conceptual data model for the second application indicates that a field is related in transactions, the system may retrieve virtual account number information for that field.

At step 410, process 400 transmits (e.g., via one or more components of FIGS. 1-3) a request for supplemental content for populating the field. For example, the system may, in response to determining that the field corresponds to a predetermined field, transmit, to a remote source, a request for supplemental content for populating the field, wherein the supplemental content is selected from available supplemental content based on the second application and the field. For example, the system may transmit an API request that includes the identification of the application (or information used to identify the application) to a remote source (e.g., web server 310 (FIG. 3)).

For example, the supplemental content may be a virtual account number for a financial service provider. Additionally or alternatively, the virtual account number may correspond to an entity corresponding to the second application. For example, the virtual account number may be unique credit card numbers that allow the application to transact on the user's main credit card account without using—or exposing—the main credit card account number to the application. The issuer of the virtual account number may allow the user to lock or delete a particular virtual account number (e.g., due to fraudulent activity) and generate a new virtual account number, without affecting the status of the main credit card account.

At step 412, process 400 receives (e.g., via one or more components of FIGS. 1-3) the supplemental content. For example, the system may receive, from the remote source, the supplemental content. The supplemental content may in some embodiments be a virtual account number for the user associated with the target application. In some embodiments, the virtual account number have been uniquely generated for a particular transaction. The number may be linked to the transaction based on transaction details (e.g., price, date, time, etc.) and only used for that particular transaction.

At step 414, process 400 populates (e.g., via one or more components of FIGS. 1-3) the field with the supplemental content. For example, the system may populate the field in the second application with the supplemental content. The system may further populate the field while the values are obscured from a user (e.g., the virtual account number may not be perceivable by the users) in order to enhance security and prevent unauthorized users from observing the virtual account number in the user interface.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-3 could be used to perform one or more of the steps in FIG. 4.

Figure 5:
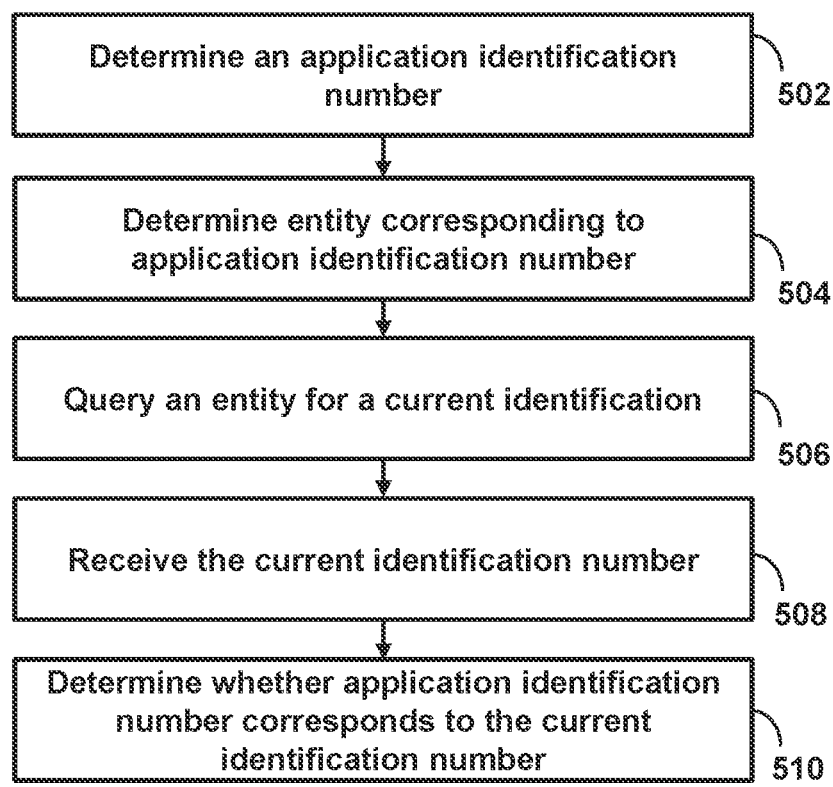
FIG. 5 shows flowchart of the steps involved in determining whether or not an application corresponds to a current version of an application, in accordance with one or more embodiments.

FIG. 5 shows flowchart of the steps involved in determining whether or not an application corresponds to a current version of an application, in accordance with one or more embodiments.

At step 502, process 500 determines (e.g., via one or more components of FIGS. 1-3) an application identification number. For example, the system may determine an application identification number for a second application. In some embodiments, the system may retrieve an application identification number and/or generate one based on retrieving mapping information from the application.

At step 504, process 500 determines (e.g., via one or more components of FIGS. 1-3) entity corresponding to application identification number. For example, the system may compare the application identification number to an application identification number database to identify an entity corresponding to the second application. In such cases, the system may compare the application identification number to a database listing application identification numbers unique to each entity.

At step 506, process 500 queries (e.g., via one or more components of FIGS. 1-3) an entity for a current identification. For example, the system may query an entity for a current identification number for the second application. For example, the system may query an entity and/or a network location associated with the entity for the current identification number for the application.

At step 508, process 500 receives (e.g., via one or more components of FIGS. 1-3) the current identification number. For example, the system may receive the current identification number for the second application from the entity. For example, in response to the query, the system may receive the current identification number and/or a verification that the application identification number is correct and/or authorized.

At step 510, process 500 determines (e.g., via one or more components of FIGS. 1-3) whether application identification number corresponds to the current identification number. For example, the system may compare the application identification number to the current identification number. For example, to ensure that the application identification number database is up-to-date, the system may query the entity to determine if the current application is the most up-to-date and/or is an authorized version of the application. If the entity responds indicating that the application identification number and/or the application is fraudulent, the system may cancel the request and/or alert the user. Such fraud prevention functionality is not available in conventional autocomplete features.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-3 could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for populating application-specific information using overlay applications, the method comprising: generating for display, on a mobile device, an application overlay, corresponding to a first application, wherein the application overlay overlays a user interface generated by a second application; receiving a user input selecting the application overlay while the user interface is displayed; in response to the user input: identifying the second application; and determining whether a field currently displayed in the user interface corresponds to a predetermined field that is automatically populated by the first application; in response to determining that the field corresponds to a predetermined field, transmitting, to a remote source, a request for supplemental content for populating the field, wherein the supplemental content is selected from available supplemental content based on the second application and the field; receiving, from the remote source, the supplemental content; and populating the field in the second application with the supplemental content.

2. The method of embodiment 1, wherein the supplemental content is a virtual account number for a financial service provider.

3. The method of embodiment 2, wherein the virtual account number corresponds to an entity corresponding to the second application.

4. The method of any one of embodiments 1-3, wherein identifying the second application comprises: determining an application identification number for the second application; and comparing the application identification number to an application identification number database to identify the second application.

5. The method of any one of embodiments 1-4, wherein identifying the second application comprises: determining an application identification number for the second application; and comparing the application identification number to an application identification number database to identify an entity corresponding to the second application.

6. The method of any one of embodiments 1-5, further comprising: querying an entity for a current identification number for the second application; receiving the current identification number for the second application from the entity; comparing the application identification number to the current identification number.

7. The method of any one of embodiments 1-6, wherein identifying the second application comprises: determining a mapping of the second application; and comparing the mapping to an application mapping database to identify an entity corresponding to the second application.

8. The method of any one of embodiments 1-7, further comprising generating for display a selectable icon corresponding to the application overlay over the user interface.

9. The method of any one of embodiments 1-8, further comprising: determining a native overlay for an operating system for the mobile device; determining a display position for the native overlay; and selecting a position for selectable icon based on the display position.

10. The method of any one of embodiments 1-9, wherein determining whether the field currently displayed in the user interface corresponds to the predetermined field that is automatically populated by the first application, further comprises: determining a conceptual data model for the second application, wherein the conceptual data model includes semantic information; and determining the field based on the conceptual data model.

11. A tangible, non-transitory, machine-readable medium storing instructions that, when executed by a data processing apparatus, cause the data processing apparatus to perform operations comprising those of any of embodiments 1-10.

12. A system comprising: one or more processors; and memory storing instructions that, when executed by the processors, cause the processors to effectuate operations comprising those of any of embodiments 1-10.
13. A system comprising means for performing any of embodiments 1-10.

What is claimed is:

1. A mobile device for populating application-specific information using overlay applications through transmissions of application programming interface ("API") requests to remote sources across a computer network, the mobile device comprising:
   memory configured to store a first application and a second application;
   control circuitry configured to:
   receive a user input selecting an application overlay, corresponding to the first application, while a user interface, generated by the second application, is displayed;
   in response to receiving the user input, identify the second application;
   determine a field currently displayed in the user interface that corresponds to a predetermined field that is automatically populated by the first application;
   determine supplemental content for populating the field, wherein the supplemental content is selected from available supplemental content based on the second application and the field; and
   populate the supplemental content in the field in the second application on the mobile device.

2. A method for populating application-specific information using overlay applications, the method comprising:
   receiving a user input selecting an application overlay, corresponding to a first application, while a user interface, generated by a second application, is displayed;
   identifying the second application;
   determining a field currently displayed in the user interface that corresponds to a predetermined field that is automatically populated by the first application;
   determining supplemental content for populating the field, wherein the supplemental content is generated based on the second application; and
   populating the supplemental content in the field in the second application.

3. The method of claim 2, wherein the supplemental content is a virtual account number for a service provider.

4. The method of claim 3, wherein the virtual account number corresponds to an entity corresponding to the second application.

5. The method of claim 2, wherein identifying the second application comprises:
   determining an application identification number for the second application; and
   comparing the application identification number to an application identification number database to identify the second application.

6. The method of claim 2, wherein identifying the second application comprises:
   determining an application identification number for the second application; and
   comparing the application identification number to an application identification number database to identify an entity corresponding to the second application.

7. The method of claim 6, further comprising:
   querying the entity for a current identification number for the second application;
   receiving the current identification number for the second application from the entity; and
   comparing the application identification number to the current identification number.

8. The method of claim 2, wherein identifying the second application comprises:
   determining a mapping of the second application; and
   comparing the mapping to an application mapping database to identify an entity corresponding to the second application.

9. The method of claim 2, further comprising generating for display a selectable icon corresponding to the application overlay over the user interface.

10. The method of claim 2, further comprising:
    determining a native overlay for an operating system for a mobile device;
    determining a display position for the native overlay; and
    selecting a position for selectable icon based on the display position.

11. The method of claim 2, wherein determining the field, further comprises:
    determining a conceptual data model for the second application, wherein the conceptual data model includes semantic information; and
    determining the field based on the conceptual data model.

12. A non-transitory computer-readable media for populating application-specific information using overlay applications comprising instructions that, when executed by one or more processors, cause operations comprising:
    receiving a user input selecting an application overlay, corresponding to a first application, while a user interface, generated by a second application, is displayed;
    in response to receiving the user input, identifying the second application;
    determining a field currently displayed in the user interface that corresponds to a predetermined field that is automatically populated by the first application;
    determining supplemental content for populating the field, wherein the supplemental content is selected from available supplemental content based on the second application; and
    populating the supplemental content in the field in the second application.

13. The non-transitory computer-readable media of claim 12, wherein the supplemental content is a virtual account number for a service provider, and wherein the virtual account number corresponds to an entity corresponding to the second application.

14. The non-transitory computer-readable media of claim 12, wherein identifying the second application comprises:
    determining an application identification number for the second application; and
    comparing the application identification number to an application identification number database to identify the second application.

15. The non-transitory computer-readable media of claim 12, wherein identifying the second application comprises:
    determining an application identification number for the second application; and
    comparing the application identification number to an application identification number database to identify an entity corresponding to the second application.

16. The non-transitory computer-readable media of claim 15, wherein the instructions further cause operations comprising:
    querying an entity for a current identification number for the second application;
    receiving the current identification number for the second application from the entity; and comparing the application identification number to the current identification number.

17. The non-transitory computer-readable media of claim 16, wherein identifying the second application comprises:
   determining a mapping of the second application; and
   comparing the mapping to an application mapping database to identify an entity corresponding to the second application.

18. The non-transitory computer-readable media of claim 12, wherein the instructions further cause operations comprising generating for display a selectable icon corresponding to the application overlay over the user interface.

19. The non-transitory computer-readable media of claim 12, wherein the instructions further cause operations comprising:
   determining a native overlay for an operating system for a mobile device;
   determining a display position for the native overlay; and
   selecting a position for selectable icon based on the display position.

20. The non-transitory computer-readable media of claim 12, wherein determining the field, further comprises:
   determining a conceptual data model for the second application, wherein the conceptual data model includes semantic information; and
   determining the field based on the conceptual data model.

* * * * *